(12) United States Patent
Moritz

(10) Patent No.: US 7,373,523 B1
(45) Date of Patent: May 13, 2008

(54) PREPARING DATA FOR STORAGE IN A SECURE FASHION

(75) Inventor: Elan Moritz, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 855 days.

(21) Appl. No.: 10/834,157

(22) Filed: Apr. 23, 2004

(51) Int. Cl.
*H04L 9/14* (2006.01)

(52) U.S. Cl. ..................................... 713/193
(58) Field of Classification Search ................ 713/193, 713/179, 189
See application file for complete search history.

(56) References Cited

U.S. PATENT DOCUMENTS 6,574,609 B1 *  6/2003  Downs et al. ................ 705/50
7,035,468 B2 *  4/2006  Yogeshwar et al. ......... 382/232

\* cited by examiner

*Primary Examiner*—Ellen Tran
(74) *Attorney, Agent, or Firm*—James T. Shepherd

(57) ABSTRACT

Digital data is prepared for storage in a secure fashion. Each data byte of a data file is encrypted. A unique bit number is assigned to each data bit in the encrypted data bytes where the bit number identifies a position of the data bit in the data file. Each such bit number is encrypted to generate a corresponding encrypted bit number. A data package is generated for each data bit. The data package includes a first data byte containing (i) a value of the data bit, and (ii) a bit storage location, at least one second data byte identifying the data file with which the data bit is associated, and at least one third data byte containing the encrypted bit number associated with the data bit. Each data package is transmitted to one of a plurality of storage locations based on the bit storage location identified in the data package's first data byte.

15 Claims, 2 Drawing Sheets

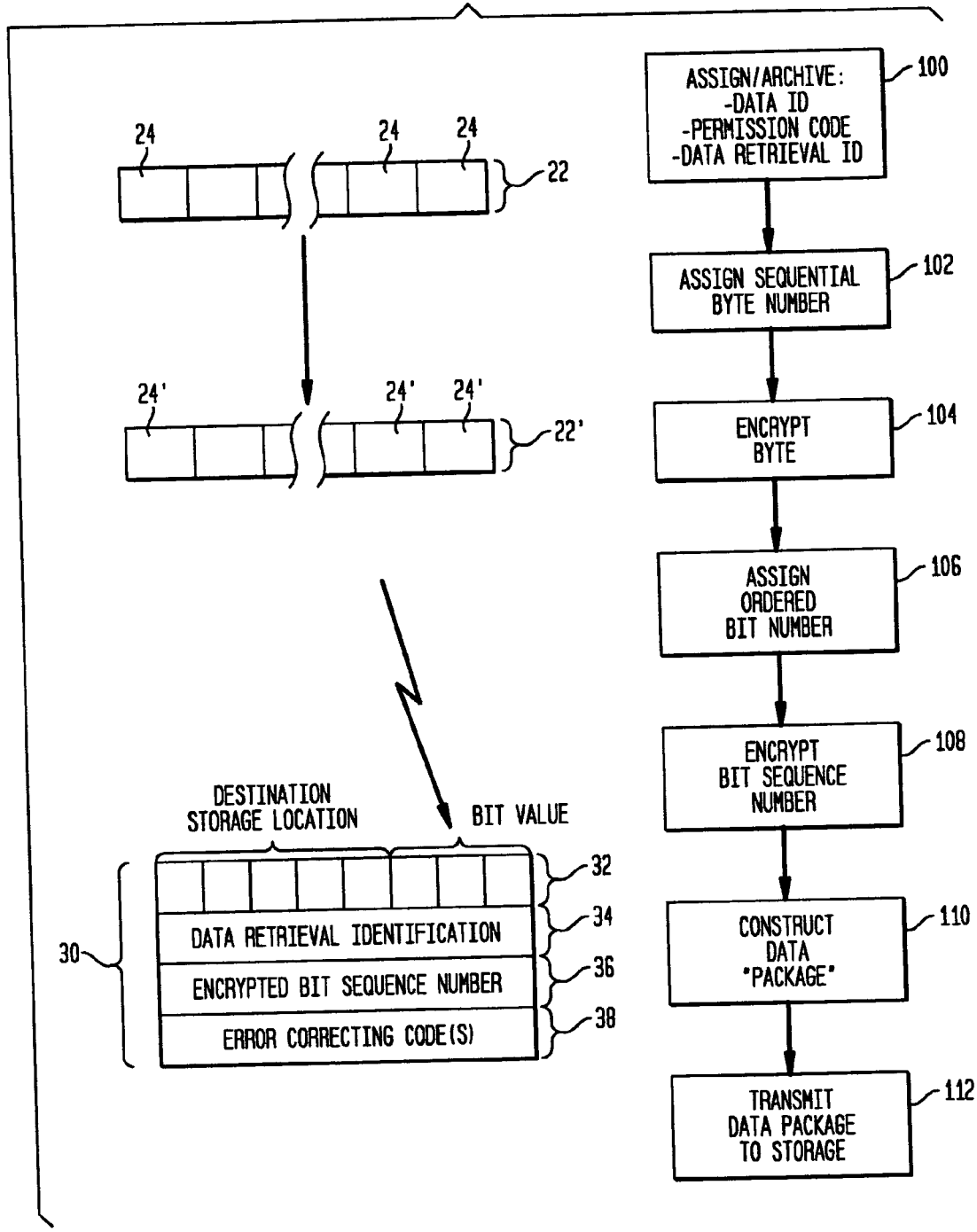

PREPARING DATA FOR STORAGE IN A SECURE FASHION

ORIGIN OF THE INVENTION

The invention described herein was made in the performance of official duties by an employee of the Department of the Navy and may be manufactured, used, licensed by or for the Government for any governmental purpose without payment of any royalties thereon.

CROSS-REFERENCE TO RELATED PATENT APPLICATIONS

This patent application is co-pending with one related patent application entitled "DATA STORAGE SYSTEM USING GEOGRAPHICALLY-DISTRIBUTED STORAGE DEVICES/FACILITIES" (Navy Case No. 96210) by the same inventor as this patent application.

FIELD OF THE INVENTION

The invention relates generally to secure storage of data, and more particularly to a method of reformatting/preparing data for storage in a secure fashion.

BACKGROUND OF THE INVENTION

Companies, organizations and civilian/military government entities often have electronic data repositories for storage of critical and/or sensitive data. The data repositories can be static storage facilities for archiving data in storage devices, or dynamic storage facilities that provide for the electronic transfer of data into and out of data storage devices. In either case, the data storage devices are typically maintained in a physical location that is secured utilizing one or more conventional "secure facility" systems such as locked rooms/buildings, security checks for personnel having authorized access to the secure facility, alarm systems, etc. However, if access is gained to the secure facility, it is often easy to physically remove or steal the data storage devices maintained in the secure facility. Given the current state-of-the-art in data storage device capacity, it is conceivable that one individual can walk off with large amounts of critical and/or sensitive data in a coat pocket. Once in possession of these data storage devices, the thief can access the secret or confidential data thereon at his leisure using his own processing equipment. Even if the stored confidential data is encrypted for security, most (if not all) encryption routines can be "cracked" given enough time and sufficient computing power.

In addition to physical theft, there has been a proliferation of cyber-crime or hacking perpetrated by unauthorized personnel or criminals. Thus, it is also desirable to increase measures that prevent electronic data access (to include data extraction or copying) by unauthorized individuals. Most methods that protect against unauthorized electronic data extraction/copying rely on combinations of encryption algorithms and/or password protection. Even if the stored confidential data is encrypted for security, most (if not all) encryption routines can be "cracked" given enough time and sufficient computing power. In addition to encryption, the advent of the internet and use of internet protocol (IP) based digital transactions has spawned protection methods that use IP-based authentication (i.e., tracing and evaluation of the originating IP address). However, many "hacking events" have demonstrated the ease with which unauthorized users can penetrate a variety of existing sophisticated data processing and storage protection systems. Indeed, stories of stolen credit card number lists, as well as break-in and manipulation of commercial, industrial and defense data centers, have become almost routine in the news.

Finally, data repositories could be the target of deliberate data destruction events (e.g., terrorists attacking a data center, criminals trying to erase data or blow up a data center containing incriminating evidence, or foreign enemies trying to disrupt U.S. military activities by destroying data repositories). Accordingly, it is desirable to prevent deliberate data destruction attempts. At a minimum, it is desirable to provide systems/methods that complicate data destruction attempts. If such prevention and/or complication efforts are successful, future attempts at data disruption or destruction will be prevented and discouraged as individuals or organizations contemplating such activities would know that their attempts to destroy meaningful data will be doomed to failure.

SUMMARY OF THE INVENTION

Accordingly, it is an object of the present invention to provide a method that reformats data in preparation for storage in a secure fashion.

Another object of the present invention is to provide a method for breaking up a data file and encrypting same prior to the storage thereof with the encryption being reversible to facilitate later retrieval and reassembly of the data after decryption.

Other objects and advantages of the present invention will become more obvious hereinafter in the specification and drawings.

In accordance with the present invention, a method of preparing data for storage in a secure fashion operates on a data file consisting of data bytes in a digital format. Each data byte is encrypted to thereby generate corresponding encrypted data bytes. A unique bit number is assigned to each data bit in the encrypted data bytes. The bit number identifies a position of the data bit in the data file. Each such bit number is encrypted to thereby generate a corresponding encrypted bit number associated with each data bit. A data package is generated for each data bit. The data package includes a first data byte containing (i) a value of the data bit, and (ii) a bit storage location, at least one second data byte identifying the data file with which the data bit is associated, and at least one third data byte containing the encrypted bit number associated with the data bit. Each data package is transmitted to one of a plurality of storage locations based on the bit storage location identified in the data package's first data byte.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 3 is a graphic depiction of the present invention's reformatting process along with a flowchart of the steps thereof.

DETAILED DESCRIPTION OF THE INVENTION

Figure 1:
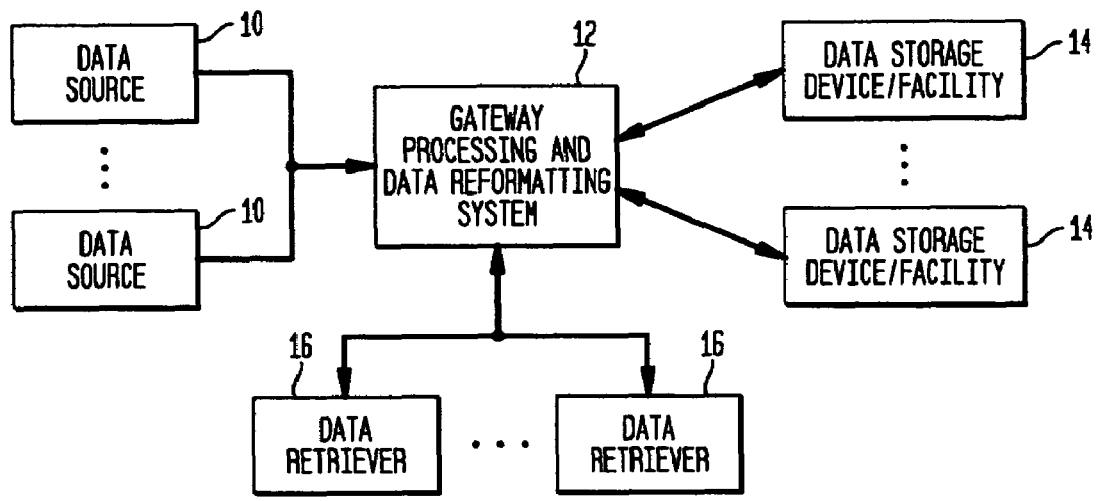
FIG. 1 is a block diagram of an embodiment of a system that can be used to carry out the method of preparing data for storage in a secure fashion in accordance with the present invention.

Referring now to the drawings, and more particularly to FIG. 1, a block diagram is shown of an embodiment of a system that includes the means to reformat data in accordance with the present invention. The reformatting process prepares the data for storage in a secure fashion. The reformatting process also places the data in a format that allows the data to be returned to its original format when an authorized request is made to retrieve the data.

In FIG. 1, one or more data sources 10 send data file(s) to a central gateway processing and data reformatting system 12 (hereinafter referred to as gateway 12) where each such data file is prepared/reformatted for storage in a secure fashion in accordance with the present invention. As will be explained in greater detail below, gateway 12 distributes the reformatted data amongst a plurality of data storage devices/facilities 14 which can be: (i) incorporated or integral with gateway 12, (ii) separate devices in proximity to gateway 12 (e.g., in the same building), (iii) separate devices that are kept together as a group with the group being located at a geographically distinct facility (e.g., miles away) relative to gateway 12, or (iv) geographically dispersed over a wide area such that miles separate any two storage devices/facilities 14. It is to be understood that the present invention can be used with any of the above scenarios and that, therefore, the location(s) of storage devices/facilities 14 is not a limitation of the present invention. As mentioned above, the reformatting process of the present invention also provides for the efficient reconstruction of the data to its original format at gateway 12 following an authorized retrieval request by a data retriever 16.

Data source 10 represents any entity or device that is the source of raw data or information. The information can be in any form ranging from digital data to an electronic form of a plain-paper, handwritten document. In the event the source information is not in a digital format, the information can be converted into digital format by data source 10 or an appropriate means (e.g., document scanner, voice digitization into MP3 files, analog-to-digital conversion for analog signals or analog data, etc.) at gateway 12. Such data conversion means and schemes are well understood in the art and, therefore, will not be described further herein.

Figure 2:
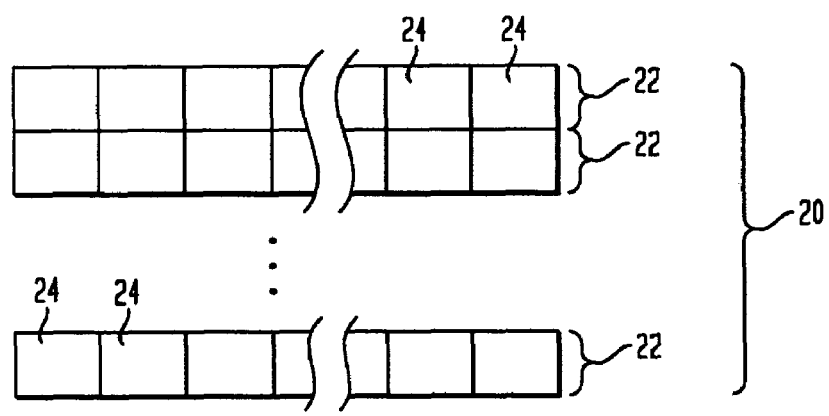
FIG. 2 is a graphic depiction of the bits and bytes of a data file that is to be reformatted and in accordance with the method of the present invention.

Data reformatting according to the present invention is performed by gateway 12 as will now be described with the aid of FIGS. 2 and 3, which will be referred to simultaneously. FIG. 2 is a graphic depiction of a data file 20 that is to be reformatted. It is assumed that data file 20 is in a digital format with each row 22 of squares being indicative of a data byte, and each square 24 being indicative of a single bit (i.e., a "0" or "1") of data in a data byte 22. FIG. 3 illustrates the reformatting process graphically and by means of a flowchart where the resulting reformatted data is prepared for storage in a secure fashion.

Each data file 20 will have its own unique identification in the form of, for example, a name, a number, a name and number, etc. The identification can be incorporated into data file 20 or can be generated or assigned by gateway 12. Associated with the data identification is a permission code that can be generated/assigned by gateway 12. At a minimum, the permission code is used to verify that a data retrieval is being made by an authorized user. Finally, a data retrieval identification unique to each data file 20 is generated/assigned by gateway 12. Regardless of their origins, gateway 12 associates and archives each data file's data identification, permission code and data retrieval identification at step 100.

It is assumed that data file 20 has sequentially ordered data bytes 22. On a byte-by-byte basis, each data byte 22 is assigned a byte number at step 102 based on the sequential position of data byte 22 in data file 20. For example, the first data byte 22 in data file 20 is assigned byte number 0, the second data byte 22 in data file 20 is assigned byte number 1, etc. Next, at step 104, data byte 22 is encrypted to generate an encrypted data byte 22' where encrypted data byte 22' retains the same bit length as data byte 22. The choice of encryption algorithm is not a limitation of the present invention. In general, it is desirable to use an encryption algorithm that can be efficiently decrypted. The encryption/decryption "key" utilized at step 104 can be the same for all data files received by gateway 12, unique for each data file received by gateway 12, or varied in some known or random fashion without departing form the scope of the present invention.

Since encrypted data byte 22' retains the same bit length as data byte 22, each individual bit 24' in encrypted data byte 22' can be assigned a bit sequence number at step 106 based on its unique ordered position in data file 20. For example, if encrypted data byte 22' was based on the fourth data byte (i.e., a sequential byte number of 3) of data file 20, the bit sequence number for the fifth bit from the right of (fourth) encrypted data byte 22' would be $$(8 \times 3) + 5 = 29$$

Note that other methods of assigning a bit sequence number could be used without departing from the scope of the present invention. The main objective is to simply have a counting method that uniquely identifies the location or ordered position of each data bit in data file 20.

Step 108 encrypts the bit sequence number generated at step 106. As with encryption step 104, there are a number of encryption algorithms that could be used without departing from the scope of the present invention. The key feature of the selected algorithm would be reversibility upon decryption such that the original bit sequence number can be recovered. It is preferable that encryption step 108 be accomplished using an encryption/decryption key that is unique to data file 20. For example, the encryption/decryption key for step 108 could be based on or be a function of the above-described data identification, permission code, or data retrieval identification.

The next step (step 110) in the present invention involves generation of a data "package" 30 containing information in the form of, for example, several bytes of data. In the illustrated example, the first byte 32 of data package 30 contains the value of one encrypted data bit 24' and a destination storage location for bit 24'. The digital "0" or "1" value of encrypted data bit 24' is stored using one or more bits of first byte 32. In the illustrated example, three bits of an 8-bit byte 32 are used to store a digital "0" (i.e., 000) or digital "1" (i.e., 111). Use of multiple bits provides a level of robustness. The remaining bits of first byte 32 contain the destination storage location for first byte 32. As mentioned above, depending on the configuration of storage devices/facilities 14, the "location" bits could identify a storage address in a device maintained at gateway 12, in proximity to gateway 12, or remotely located with respect to gateway 12.

Data package 30 has other bytes of data appended to first byte 32. For example, the previously-described data retrieval identification can be contained in one or more second bytes 34 while one or more third bytes 36 contain the encrypted bit sequence number generated at step 108. Finally, one or more bytes 38 containing error correcting code(s) can be included with each data package 30.

Each data package 30 generated at step 110 is next transmitted (e.g., via hardwire connection, wireless connection, etc.) at step 112 to one of storage device/facilities 14. Security of the data is improved if data packages 30 are distributed amongst (e.g., evenly or approximately evenly) a plurality of storage devices/facilities 14. Enhanced security for the data is achieved by locating storage devices/facilities 14 at a secure facility away from gateway 12. A much greater level of security for the data is achieved by geographically dispersing storage devices/facilities 14 over a wide area such that relatively great distances (e.g., miles) separate any two devices/facilities 14. In this way, a destruction of any one of storage devices/facilities 14 merely "punches a hole" in the data, but does not completely destroy the data. Obviously, the greater the number of different storage devices/facilities 14, the more insignificant the destruction of any one of devices/facilities 14 becomes.

With data package 30 constructed in the above-described fashion, gateway 12 response to a request for data retrieval in the following fashion. Gateway 12 first verifies that the data retrieval request is authorized. For example, gateway 12 can check the data retrieval request (originating at one of data retrievers 16) for agreement with the permission code maintained at gateway 12. Assuming the data retrieval request is authorized, gateway 12 retrieves all data packages 30 at the various storage devices/facilities 14 containing the matching data retrieval identification in byte(s) 34. Each such data package 30 would be sent back to gateway 12 where the encrypted bit sequence number is decrypted. This allows the original encrypted data file to be reconstructed. After this, decryption of the reconstructed and encrypted data file can proceed with the original data file being recovered.

The advantages of the present invention are numerous. A simple and reversible method is provided for reformatting/preparing data for storage in a secure fashion. The method can be used with a system that is contained in a single location or can be used with a system having storage devices/facilities dispersed over a wide geographic area.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of preparing data for storage in a secure fashion, comprising the steps of:
   providing a data file consisting of data bytes in a digital format;
   encrypting each of said data bytes to generate corresponding encrypted data bytes;
   assigning a unique bit number to each data bit in said encrypted data bytes, said bit number identifying a position of said data bit in said data file;
   encrypting each said bit number to generate a corresponding encrypted bit number associated with each said data bit;
   generating a data package for each said data bit, said data package including
   a first data byte containing (i) a value of said data bit, and (ii) a bit storage location,
   at least one second data byte identification said data file with which said data bit is associated, and
   at least one third data byte containing said encrypted bit number associated with said data bit; and
   transmitting each said data package to one of a plurality of storage locations based on said bit storage location identified in said data package's first data byte.

2. A method according to claim 1 further comprising the step of encoding each said data package with an error correcting code prior to said step of transmitting.

3. A method according to claim 1 wherein said step of providing includes conversion of said data file into said digital format.

4. A method according to claim 1 wherein said bit number identifies an ordered position of said data bit in said data file.

5. A method according to claim 1 wherein said step of generating produces a plurality of data packages, and wherein said step of transmitting includes the step of distributing said plurality of data packages approximately evenly amongst said plurality of storage locations.

6. A method of preparing data for storage in a secure fashion, comprising the steps of:
   providing a data file consisting of data bytes in a digital format;
   encrypting each of said data bytes using a first encryption/decryption key to generate corresponding encrypted data bytes;
   assigning a unique bit number to each said data bit in said encrypted data bytes, said bit number identifying a position of said data bit in said data file;
   encrypting each said bit number using a second encryption/decryption key unique to said data file to generate a corresponding encrypted bit number associated with each said data bit;
   generating a data package associated with each said data bit, said data package including
   a first data byte containing (i) a value of said data bit, and (ii) a bit storage location,
   at least one second data byte identification said data file with which said data bit is associated, and
   at least one third data byte containing said encrypted bit number associated with said data bit; and
   transmitting each said data package to one of a plurality of storage locations based on said bit storage location identified in said data package's first data byte.

7. A method according to claim 6 further comprising the step of encoding each said data package with an error correcting code prior to said step of transmitting.

8. A method according to claim 6 wherein said step of providing includes conversion of said data file into said digital format.

9. A method according to claim 6 wherein said bit number identifies a sequentially ordered position of said data bit in said data file.

10. A method according to claim 6 wherein said step of generating produces a plurality of data packages, and wherein said step of transmitting includes the step of distributing said plurality of data packages approximately evenly amongst said plurality of storage locations.

11. A method of preparing data for storage in a secure fashion, comprising the steps of:
   providing a data file consisting of data bytes in a digital format;

establishing a first code required for access to said data file, said first code being unique to said data file;

establishing a second code for identifying an association with said data file;

encrypting each of said data bytes using a first encryption/decryption key to generate corresponding encrypted data bytes;

assigning a unique bit number to each said data bit in said encrypted data bytes, said bit number identifying a position of said data bit in said data file;

encrypting each said bit number using a second encryption/decryption key based on said first code to generate a corresponding encrypted bit number associated with each said data bit;

generating a data package associated with each said data bit, said data package including a first data byte containing (i) a value of said data bit, and (ii) a bit storage location, at least one second data byte containing said second code, and at least one third data byte containing said encrypted bit number associated with said data bit; and transmitting each said data package to one of a plurality of storage locations based on said bit storage location identified in said data package's first data byte.

12. A method according to claim 11 further comprising the step of encoding each said data package with an error correcting code prior to said step of transmitting.

13. A method according to claim 11 wherein said step of providing includes conversion of said data file into said digital format.

14. A method according to claim 11 wherein said bit number identifies a sequentially ordered position of said data bit in said data file.

15. A method according to claim 11 wherein said step of generating produces a plurality of data packages, and wherein said step of transmitting includes the step of distributing said plurality of data packages approximately evenly amongst said plurality of storage locations.

* * * * *